United States Patent [19]

Jacobson et al.

[11] 3,716,477

[45] *Feb. 13, 1973

[54] LOW PRESSURE REGENERATIVE REFORMING PROCESS

[75] Inventors: Robert L. Jacobson, Penole; Robert D. Vanselow, Kensington, both of Calif.

[73] Assignee: Chevron Research Company, San Francisco, Calif.

[ * ] Notice: The portion of the term of this patent subsequent to Jan. 26, 1988, has been disclaimed.

[22] Filed: Oct. 6, 1970

[21] Appl. No.: 80,885

Related U.S. Application Data

[63] Continuation-in-part of Ser. No. 64,067, July 24, 1970, abandoned, which is a continuation of Ser. No. 740,566, June 27, 1968, abandoned.

[52] U.S. Cl. ..................................208/139, 208/140
[51] Int. Cl. ............................................C10g 35/08

[58] Field of Search..............................208/139, 140

[56] References Cited

UNITED STATES PATENTS 3,558,479  1/1971  Jacobson et al. ......................208/139

*Primary Examiner*—Daniel E. Wyman
*Assistant Examiner*—Werten F. W. Bellamy
*Attorney*—G. F. Magdeburger, R. H. Davies, J. A. Buchanan, Jr. and T. G. De Jonghe

[57] ABSTRACT

A naphtha feed is reformed to high octane gasoline products at a pressure from 20 to 100 psig, a hydrogen or hydrocarbon mole ratio of less than 2 and a liquid hourly space velocity of 0.5 to 5, using a catalyst comprising platinum and rhenium supported on a porous inorganic oxide carrier. The reforming process is periodically discontinued to permit regeneration of the catalyst to restore substantially its initial activity.

10 Claims, 3 Drawing Figures

INVENTORS
ROBERT L. JACOBSON
ROBERT D. VANSELOW

BY *Hubert E. Dubb*
*C. J. Tonkin*
ATTORNEYS

LOW PRESSURE REGENERATIVE REFORMING PROCESS

CROSS REFERENCE

This application is a continuation-in-part of copending application Ser. No. 64,067, filed July 24, 1970 now abandoned, which is in turn a continuation of copending application Ser. No. 750,566, filed June 27, 1968, now abandoned.

BACKGROUND OF THE INVENTION

1. Field

This invention relates to hydrocarbon reforming processes. More particularly, the present invention is concerned with reforming processes conducted at low pressures, i.e., below 100 psig, and low hydrogen to hydrocarbon mole ratios, i.e., below about 2, under regenerative conditions to produce high octane gasolines.

2. Prior Art

Reforming of hydrocarbon naphtha feeds to produce high octane gasoline products has successfully been accomplished at high pressures, e.g., greater than 350 psig, using catalysts comprising platinum on a porous inorganic oxide, particularly alumina. Generally, high pressures help limit those reactions occurring during reforming which significantly affect coke formation on the catalyst, as, for example, condensation and polymerization. As a consequence, high pressure reforming processes permit long onstream periods of operation, e.g., period of several months, between replacement and/or regeneration of the catalyst. However, there are disadvantages to high pressure reforming. At high pressures, reactions which adversely affect the yield of valuable $C_5+$ products are more prevalent, compared to lower pressures. Thus, at high pressures, where significant amounts of hydrogen are present, hydrocracking reactions are favored, thus leading to production of light, less valuable, gases. Furthermore, high pressures, particularly when coupled with high hydrogen levels, are not favorable for dehydrocyclization and dehydrogenation reactions, both of which are important upgrading reactions for producing high octane gasoline.

Certainly there is sufficient incentive for very low pressure reforming, e.g., increased yields. Thus, significant effort has been expended by the petroleum industry to develop suitable low pressure reforming processes, i.e., processes which operate at pressures below 350 psig. However, there are many problems involved in low pressure reforming. For example, as the pressure in the reaction zone is lowered, the rate of catalyst fouling generally increases significantly; thus, it becomes necessary to regenerate the catalyst more frequently. In order to help control catalyst deactivation at the low pressures, high hydrogen to hydrocarbon mole ratios are generally considered necessary. However, high hydrogen to hydrocarbon mole ratios at low pressures create problems arising from handling large volumes of hydrogen. Thus, at low pressures and high hydrogen to hydrocarbon mole ratios, large compressors and pipes, etc., must be used in order to accommodate the large volumes of hydrogen.

While many low pressure reforming processes have been developed and are now commercially available, such low pressure processes are generally operated at reactor pressures of from 100 to 300 psig, and preferably at about 200 psig. Furthermore, to curtail as far as possible undesirable catalyst fouling reactions, these low pressure processes generally use relatively high hydrogen to hydrocarbon mole ratios, e.g., of the order 4 – 6. Even then, such processes operate for short onstream times between regenerations, i.e., of the order of 24 to 48 hours. Processes using pressures lower than about 100 psig, and hydrogen to hydrocarbon mole ratios lower than about 4 and particularly lower than about 2 have not been commercially attractive because of the high rate of catalyst deactivation.

SUMMARY OF THE INVENTION

A low pressure reforming process has now been developed which permits the production of high octane gasoline in high yields. The low pressure reforming process is conducted at an average reactor pressure of from 20 to 100 psig and a hydrogen to hydrocarbon mole ratio of less than 2, using a catalyst comprising a porous inorganic oxide in association with from 0.01 to 3 weight percent platinum, 0.01 to 5 weight percent rhenium, and 0.1 to 3 weight percent halide. The process is considered regenerative in the sense that the onstream period between regeneration of the catalyst is usually of the order of several hundred hours, or less, rather than several months as is the case with non-regenerative systems. Thus, it is generally preferred to regenerate the catalyst at least every 500 hours, and preferably at least every 300 hours. The low pressure permits high yields of high octane gasoline to be produced. The low hydrogen to hydrocarbon mole ratio is advantageous since large volumes of hydrogen need not be handled during the reforming process.

Thus, the process of the present invention comprises reforming a naphtha feed in the presence of hydrogen in a reaction zone at reforming conditions including a pressure of from 20 to 100 psig, a hydrogen to hydrocarbon mole ratio of less than 2, lower hydrogen to hydrocarbon mole ratios preferably being used with the lower pressures, and a liquid hourly space velocity of from 0.5 to 5, in the presence of a catalyst comprising a porous inorganic oxide carrier associated with from 0.01 to 3 weight percent platinum, from 0.01 to 5 weight percent rhenium, and from 0.1 to 3 weight percent halide. The contact of feed with the catalyst is periodically discontinued and the catalyst regenerated to restore substantially the initial activity. Then the feed is again contacted with the catalyst at reforming conditions as above-described.

BRIEF DESCRIPTION OF THE DRAWINGS

The present invention can be better understood and will be further explained hereinafter with reference to the graphs in FIGS. 1, 2 and 3.

The graphs in FIGS. 1 and 2 show as a function of the onstream time the average catalyst temperature and the $C_5+$ gasoline yield produced, respectively, for a reforming process conducted in accordance with the present invention. The reforming conditions included an average reactor pressure of 60 psig, a hydrogen to hydrocarbon mole ratio of 1.5, and a liquid hourly space velocity of 2. The catalyst temperature was adjusted as fouling occurred to maintain production of a 97 F–1 clear octane product. The catalyst comprising platinum and rhenium on alumina, chloride also being present, was regenerated when the average catalyst temperature was about 850° F. The catalyst responded well to regeneration and the yield of $C_5+$ product remained high over the entire run length. Furthermore, the reforming periods, before and after regeneration, were of substantial duration, i.e., around 200 to 300 hours. This is significant considering the low pressure and low hydrogen to hydrocarbon mole ratio used in the process.

Figure 3:
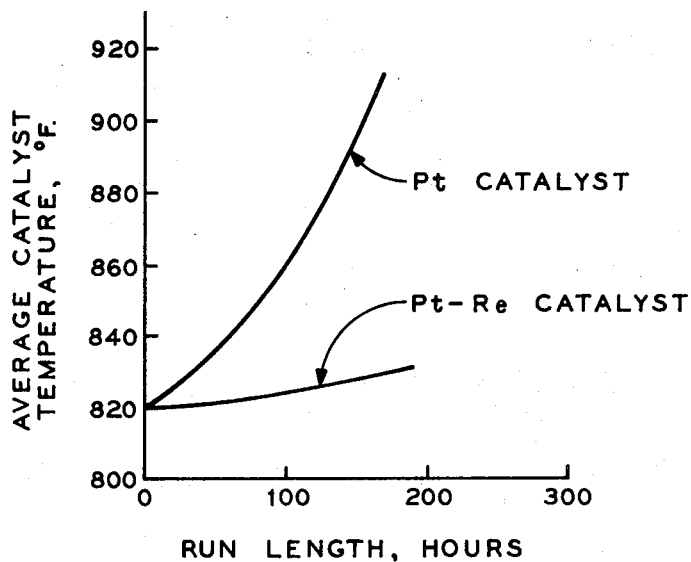

The graph in FIG. 3 shows, for comparison purposes, the performance for reforming of naphtha of a catalyst comprising platinum on alumina and a catalyst comprising platinum and rhenium on alumina. The conditions of operation for the reforming process using both catalysts included a pressure of 60 psig, and a hydrogen to hydrocarbon mole ratio of 1.5 and a space velocity of approximately 2. A 97 F–1 clear octane product was produced in both cases. The catalyst comprising platinum without rhenium exhibited rapid fouling at the low pressure and low hydrogen to hydrocarbon mole ratio. Such rapid fouling makes the platinum catalyst without rhenium undesirable for low pressure regenerative reforming, i.e., reforming at less than 100 psig and at a hydrogen to hydrocarbon mole ratio less than 2. The catalyst comprising platinum and rhenium on alumina performed significantly better than the platinum catalyst without rhenium.

DESCRIPTION OF THE INVENTION

In general, commercially available low pressure regenerative systems using platinum-containing catalysts are not operated at pressures below 100 psig. Generally, the pressures used in the petroleum industry for low pressure regenerative systems are above 100 psig and preferably about 200 psig. In the process of the present invention, the pressure is maintained at from 20 to 100 psig, and preferably from 40 to 100 psig and most preferably from 40 to 80 psig. The pressure is determined as the average reactor pressure. Thus, for example, in a process where several reactors are in series with the flow of feed from the outlet of one reactor to the inlet of the other reactor, the pressure, i.e., 20 to 100 psig, will be the average of the pressures throughout the several reactors. When only one reactor is used, the pressure will be the average pressure through that reactor.

Pressures below about 20 psig could be used, but in general, lower pressures are not economically feasible. At pressures below about 20 psig, difficulty may be occasioned in circulating the feed and reformed product as well as hydrogen through the reforming system. Thus, operating at an average reactor pressure substantially below 20 psig would require part of the system, e.g., the separator, being under vacuum in order to provide sufficient pressure drop in the system to circulate the feed, etc. Pressures greater than 100 psig are not desired since then the advantages of the low reforming pressures cannot be fully realized, e.g., high yields, generally lower reforming temperatures, etc.

Reforming is generally accomplished in the presence of hydrogen. The presence of hydrogen serves to reduce the formation of coke present in the catalyst. Further, the presence of hydrogen can be used to favor certain reforming reactions. For purposes of the present invention the amount of hydrogen is maintained sufficiently low so that the hydrogen to hydrocarbon mole ratio is less than 2. The "hydrocarbon" used in measuring the hydrogen to hydrocarbon mole ratio is considered to be the naphtha feed and does not include light hydrocarbon gases which may be present in a recycle hydrogen stream. For purposes of the present invention, the hydrogen to hydrocarbon mole ratio is measured at the inlet of the reactor and in the case of several reactors in series, at the inlet of the first reactor. Preferably, the hydrogen to hydrocarbon mole ratio will be from 0.5 to 2.

Hydrogen may be introduced from an extraneous source, e.g., pure hydrogen from bottles may be used. Thus, the hydrogen may be used only on a once-through basis. Inasmuch as reforming generally results in the production of hydrogen, hydrogen produced in the reaction may be separated from the reformate and recycled to the reaction zone. Thus, extraneous hydrogen need not necessarily be added to the reforming process. However, if desired, extraneous hydrogen may be used at some stage of the operation, as, for example, during startup. Regardless of the source of the hydrogen, the hydrogen can be introduced into the feed prior to contact with the catalyst or can be contacted simultaneously with the introduction of feed to the reaction zone. The hydrogen need not necessarily be pure hydrogen, but may contain light hydrocarbon gases in admixture therewith. Generally, when hydrogen is recirculated to the reaction zone, light hydrocarbon gases will be recirculated with the hydrogen. It is preferred that relatively pure hydrogen be used; however, difficulty and expense in purifying recycle hydrogen often prevents this from being the case.

At the very low pressures involved in the process of the present invention it may not be necessary to add hydrogen to the reaction zone, either as recycle hydrogen or as extraneous hydrogen. Reforming results in the production of hydrogen, and this hydrogen produced in the reaction zone may be sufficient to prevent rapid fouling of the catalyst. Thus, the hydrogen to hydrocarbon mole ratio would be considered effectively zero under such circumstances. However, for purposes of the present invention, it is generally preferred that the hydrogen to hydrocarbon mole ratio be at least 0.5, i.e., that some hydrogen be added to the reaction zone.

As the pressure in the reaction zone is decreased, it is preferred to decrease the hydrogen to hydrocarbon mole ratio. As previously explained, operating at low pressures presents difficulties in handling large volumes of hydrogen. The lower the pressure, the lower should be the hydrogen to hydrocarbon mole ratio. Thus, when operating at pressures of, for example, less than 50 psig, the hydrogen to hydrocarbon mole ratio should preferably be less than 1.

The feed rate used in the present invention, i.e., the liquid hourly space velocity (LHSV), should be from 0.5 to 5, and preferably from 1 to 3. Higher space rates than about 5 are undesirable because of the difficulty of the catalyst to make the desired conversion.

The temperature of the reforming process will generally be in the range of 600° to 1100°F and preferably from 750° to 1,050°F. The temperature will be determined, generally, by the other operating conditions, i.e., at a particular pressure, liquid hourly space velocity, and hydrogen to hydrocarbon mole ratio the temperature is determined by the octane number of products to be produced. Reforming at low pressures generally permits lower reforming temperatures to be used to produce a gasoline product of the desired octane rating than reforming at high pressures. This has the advantage of requiring less heating capacity in the furnaces used to heat the naphtha to reaction conditions. However, at low pressures and low hydrogen to hydrocarbon mole ratios, difficulty may be experienced in maintaining the reactor at the desired temperature to produce a product of a desired octane rating. The volume of gas, e.g., hydrogen entering the reaction zone, may not be sufficient to provide the desired heat input. Thus, it may be desirable to provide heat pipes or heating coils in the reaction zone to maintain sufficiently high temperature for reforming. Also, an isothermal system could be used rather than the more common adiabatic processes.

The catalyst which finds use in the low pressure reforming process of the present invention comprises a porous inorganic oxide carrier or support containing from 0.01 to 3 weight percent platinum and from 0.01 to 5 weight percent rhenium and from 0.1 to 3 weight percent halide. Porous inorganic oxide carriers or supports useful in the present invention include a large number of materials with which the catalytically active amounts of platinum and rhenium can be disposed. Thus, the support can be natural or synthetically produced inorganic oxides or combination of inorganic oxides. Typical acidic inorganic oxides which can be used are the naturally occurring aluminum silicates, particularly when acid treated to increase the activity, and the synthetically produced cranking supports, such as silica-alumina, silica-zirconia, silica-alumina-zirconia, silica-magnesia, silica-alumina-magnesia, and crystalline zeolitic aluminosilicates. Generally, however, reforming processes are preferably conducted in the presence of inorganic oxides such as magnesia and alumina. These catalysts have limited acidity. The inorganic oxide supports for purposes of the present invention must be porous, i.e., have a surface area of from 50 to 700 $m^2$/gm and more preferably from 150 to 700 $m^2$/gm.

Alumina is particularly preferred for purposes of this invention. Any of the forms of alumina suitable as a support for reforming catalysts can be used. Furthermore, alumina can be prepared by a variety of methods satisfactory for purposes of this invention. The preparation of alumina for use in reforming catalysts is well known in the art.

Various methods of preparation can be used for associating the platinum and rhenium with the porous inorganic oxide carrier. Platinum and rhenium can be disposed on the porous inorganic oxide in intimate admixture with each other by such suitable techniques such as ion-exchange, coprecipitation, impregnation, etc. It is not necessary that both metals be incorporated onto the porous inorganic oxide by the same technique. Thus, one of the metals can be associated with the carrier by one method such as, for example, impregnation, and the other metal associated with the carrier by another technique such as, for example, coprecipitation. Furthermore, the metals can be associated with the carrier either simultaneously or sequentially. It is generally preferred that the metals be associated with the carrier by impregnation, either sequentially or simultaneously. In general, the carrier material is impregnated with an aqueous solution of a decomposable compound of the metal in sufficient concentration to provide the desired quantity of metal in the finished catalyst. To incorporate platinum on the catalyst by impregnation, chloroplatinic acid is preferred. Other platinum-containing compounds can be used, e.g., chloroplatinates and polyammineplatinum salts. Rhenium is suitably incorporated onto the carrier by impregnation with perrhenic acid. However, ammonium or potassium perrhenates, among others, can also be used.

It is contemplated in the present invention that incorporation of the metals with the carrier can be accomplished at any particular stage of the catalyst preparation. For example, if the metals are to be incorporated onto an alumina support, the incorporation can take place while the alumina is in the gel or sol form. Alternatively, a previously prepared alumina carrier can be impregnated with a water solution of the metal compounds. Generally, the catalyst is preferably prepared by impregnating the metals onto a previously prepared porous inorganic oxide carrier. The metals are desirably uniformly distributed on the surface of the carrier and are preferably in intimate admixture with each other on the support.

The platinum-rhenium catalyst should comprise platinum in an amount from 0.01 to 3 weight percent and more preferably, from 0.2 to 1 weight percent of the finished catalyst. Concentrations of platinum below about 0.01 weight percent are too low for satisfactory reforming operations. On the other hand, concentrations of platinum above about 3 weight percent are generally unsatisfactory due to the high cost of the platinum metal. The concentration of rhenium in the finished catalyst composition is preferably in the range of from 0.01 to 5 weight percent and more preferably, from about 0.01 to 2 weight percent. Higher concentrations of rhenium could be advantageously used but the cost of rhenium limits the amount attractive for use in the present invention. It is preferred that the rhenium to platinum atom ratio be from 0.1 to 2 and more preferably, that the atom ratio of rhenium to platinum not exceed one.

After incorporating platinum and rhenium onto the porous inorganic oxide carrier, the resulting composite is usually dried by heating at a temperature of no greater than about 500° F and preferably from about 200° to 400° F. If the metals are sequentially incorporated onto the porous inorganic oxide support, the catalyst may be dried after the addition of the first metal but before the addition of the other. Furthermore, the catalyst composite containing only one metal can be calcined at an elevated temperature, e.g., up to about 1,200° F, if desired, prior to incorporation of the other metal component. Generally, however, calcination at an elevated temperature, e.g., from 700° to 1,200° F, is done only after both metals have been incorporated onto the carrier and the composite dried.

Prior to using the catalyst in the low pressure process of the present invention, the composite of platinum and rhenium with the inorganic oxide carrier is heated in the presence of hydrogen to reduce the metals; preferably dry hydrogen is used although other reducing agents could possibly be used. In particular, it is preferred that the prereduction be accomplished at a temperature in the range of 600° to 1,300°F and preferably from 600° to 1,000°F.

The catalyst used in the present invention preferably has a limited amount of acidity. Thus, the catalyst preferably contains a halide and more preferably, a chloride or fluoride. Bromides may also be used. The halide should be present in an amount from 0.1 to 3 weight percent total halide content and preferably from 0.1 to 2 weight percent. The halide in an amount of 0.1 to 3 weight percent provides the limited amount of acidity necessary for the reforming at the low pressures and low hydrogen to hydrocarbon mole ratios. The halide can be incorporated onto the catalyst carrier at any suitable stage of catalyst manufacture, e.g., prior to or following incorporation of the platinum and rhenium. Generally, halide is incorporated onto the carrier in the process of impregnating metals onto the carrier; e.g., impregnating the carrier with chloroplatinic acid normally results in chloride addition to the carrier. However, more halide may be desired, in which case additional halide can be incorporated onto the support simultaneously with the incorporation of the metal or following incorporation of the metal. In general, halides are combined with the catalyst carrier by contacting suitable compounds such as hydrogen fluoride, ammonium fluoride, hydrogen chloride or ammonium chloride, using the gaseous form or a water soluble form, with the carrier. Preferably, the halide is incorporated onto the carrier from an aqueous solution containing said halide.

The process of the present invention is not limited to a particular type of naphtha feedstock. Thus, the feedstock can be, for example, a straight-run naphtha, a thermally-cracked naphtha or a catalytically-cracked naphtha or blends thereof. Preferably, the naphtha is a hydrogenated naphtha, e.g., a hydrocracked naphtha. Thus, the naphtha boiling range material from a hydrocracking process is an ideal feed for the low pressure reforming process of the present invention. In general, the naphtha useful in the present invention would boil in the range falling within the limits of from about 70° to 550° F and preferably from 150° to 450° F. In general, the feed will preferably have a temperature at which 95 volume percent distills during an ASTM D–86 distillation ("ASTM Standards," Petroleum Products — Fuels, Solvents, Engine Tests, Lubricating Oils, Cutting Oils, Grease, Part 17, 1965) of from about 300° to 400° F and preferably from about 320° to 380° F.

The feed used should preferably be substantially sulfur free, that is, the feed should preferably contain less than about 10 ppm sulfur and more preferably, less than 5 ppm and still more preferably, less than 1 ppm. Sulfur apparently has a detrimental effect upon the activity of the catalyst as well as the stability. It is recognized that in processes where a recycle hydrogen stream is used, sulfur may build up in the recycle stream; i.e., sulfur entering the reforming system in the naphtha feed may not necessarily be entirely scrubbed from the products or bled from the recycle stream, but may be allowed to recycle with the hydrogen-rich gas to the reforming reaction zone. However, the amount of sulfur which can build up in the recycle stream is, in general, limited by the amount of sulfur in the feed.

In the case of a feedstock which is not already low in sulfur, acceptable levels can be reached by hydrogenating the feedstock in a presaturation zone, e.g., hydrodesulfurization zone, wherein the naphtha is contacted with a hydrogenation catalyst which is resistant to sulfur poisoning. A suitable hydrodesulfurization catalyst comprises, for example, an alumina-containing support and a minor proportion of molybdenum oxide and cobalt oxide. Hydrodesulfurization conditions normally include a temperature from 600° to 850° F, a pressure from 200 to 2,000 psig, and a liquid hourly space velocity from 1 to 5. The sulfur contained in the naphtha is converted to hydrogen sulfide which can be removed prior to reforming. Suitable conventional processes can be used to remove the hydrogen sulfide.

Reforming at low pressures and low hydrogen to hydrocarbon mole ratios requires periodic regeneration of the catalyst. Thus, the reforming system used in the present invention should provide for frequent regeneration in order to obtain long overall run lengths. A variety of well-known regenerative systems is applicable to the process of the present invention. Thus, the process of the present invention can be used in a fluidized reforming system wherein the catalyst is continuously circulated between a reforming zone and a regeneration zone. The reforming process of the present invention can also be used in fixed bed systems wherein the catalyst is disposed in a plurality of reactors which are connected in series to allow for flow of feed from the outlet of one reactor to the inlet of the next reactor and in which each reactor is capable of being removed or isolated from the system and regenerated without discontinuing the flow of feed throughout the other reactors. Thus, regenerative fixed bed systems provided with swing reactors or shift reactors as disclosed in the prior art can be used. Other prior art processes, as, for example, regenerative moving bed processes may also be used.

In a reactor system wherein several reactors are in series, the catalyst in the end or tail reactors will generally be regenerated more frequently than the front reactors. Thus, the tail reactor of a four-reactor system may be offstream, and the catalyst therein undergoing regeneration 50 percent of the total time spent in regeneration of the catalyst in the several reactors, whereas the front reactor may be regenerated only 10 percent of the time. The front reactors may thus operate for several hundred hours before regeneration whereas the tail reactors might only operate 20 to 100 hours before regeneration. Normally, the average onstream time between regenerations of the several reactors will not be greater than about 500 hours and preferably will not be more than about 300 hours.

The regeneration time should preferably be short in comparison to the overall reforming time. Thus, it is preferred that the regeneration time be less than about 20 percent of the onstream reforming time. When several reactors are in series, the average time for regeneration for the catalyst in all the reaction zones preferably should not exceed 20 percent of the average onstream reforming time. At the low pressures of, e.g., 20 to 50 psig, catalyst fouling will be faster and hence regeneration will be more frequent than at higher pressures, e.g., above 50 psig. However, in general, the regeneration time will normally be about the same regardless of the pressure at which the reforming process is conducted.

The catalyst is regenerated by heating the catalyst at combustion temperatures in the presence of an oxygen-containing gas. The oxygen should initially preferably be present in a limited amount, e.g., less than about 2 volume percent of the regeneration gas. The rest of the gas should preferably be an inert gas. The presence of high amounts of oxygen during the initial portion of the regeneration step could result in a temperature runaway. The inert oxygen-containing gas, e.g., flue gas, nitrogen, etc., is passed over the bed of catalyst at an initial temperature from, for example, 700° to 900° F. to produce a flame front or combustion zone which travels through the catalyst bed. The amount of oxygen in the introduced gas is controlled to prevent this combustion front from exceeding about 1,250° F. and is preferably maintained at about 1,000°–1,100° F. After the carbon is burned from the catalyst, chloride or another halide may be added to the catalyst at the elevated temperature.

Reforming at low pressures and low hydrogen-to-hydrocarbon mole ratios generally requires exposing the catalyst, preferably at combustion temperature, to an oxygen-containing gas that contains more than about 2 volume percent oxygen to rejuvenate it. Preferably the rejuvenating gas contains at least 5 percent oxygen, more preferably at least 20 percent oxygen. Most preferably the rejuvenating gas is substantially pure oxygen. If the rejuvenation step is not performed at least after about each third regeneration, the reforming periods between regenerations will be of significantly shortened duration. Preferably the regenerated catalyst is contacted with the oxygen-containing gas having more than about 2 volume percent oxygen for at least about 0.5 hour. The contacting preferably occurs for a time falling within the range from about 1 hour to about 18 hours.

Following regeneration and/or rejuvenation of the catalyst, the system is purged with nitrogen or other inert gas to remove any oxygen present and then the catalyst is contacted with hydrogen to reduce the metals. Thereafter, the naphtha and hydrogen are contacted with the catalyst under the reforming conditions used initially. Preferably the regeneration of the catalyst is done at temperatures and pressures near those used in the reforming process.

The process of the present invention is particularly useful in producing high octane gasoline, i.e., gasoline of 90 F–1 clear octane and preferably 95 F–1 clear octane. Furthermore, the low pressure reforming results in the production of high yields of $C_5+$ product. Thus, yields of greater than 85 volume percent $C_5+$ product can be produced during the reforming process. The present process is particularly valuable at the present time when the demand for high octane gasoline is increasing and the use of lead to increase octane is becoming the subject of public scrutiny.

Furthermore, the process of the present invention is particularly useful in the production of benzenes, toluenes, and xylenes. The low pressures and low hydrogen to hydrocarbon mole ratios are particularly suitable to the production of high yields of these compounds. Thus, passing a naphtha feed over the platinum-rhenium catalyst at a pressure of less than about 100 psig and a hydrogen to hydrocarbon mole ratio of less than 2 will result in high yields of these products, particularly benzene and toluene. It may be desirable to use a hydrocarbon feed containing primarily $C_9$ and lower hydrocarbons, i.e., a feed boiling within the range of 150° to 330° F. Dehydrocyclization, dehydrogenation, and dealkylation type reactions will result in the production of good yields of benzene, toluene, and xylene.

The present invention may be better understood with reference to the following examples.

EXAMPLE 1

A catalyst comprising 0.6 weight percent platinum and 0.6 weight percent rhenium and containing about 0.6 weight percent chloride supported on an alumina carrier was used in reforming a hydrocracked naphtha. The reforming process was conducted at reforming conditions including an average reactor pressure of 60 psig, a hydrogen to hydrocarbon mole ratio of 1.5 and a liquid hourly space velocity of 2. The temperature of the catalyst was adjusted throughout the run to maintain production of a 97 F–1 clear octane product. The run was made using recycle hydrogen.

The hydrocracked naphtha boiled within the range of 205° to 384° F. and contained 56 volume percent naphthenes, 36 volume percent paraffins, and 8 volume percent aromatics. The feed was obtained as naphtha cut from a catalytic hydrocracking unit.

Figure 1:
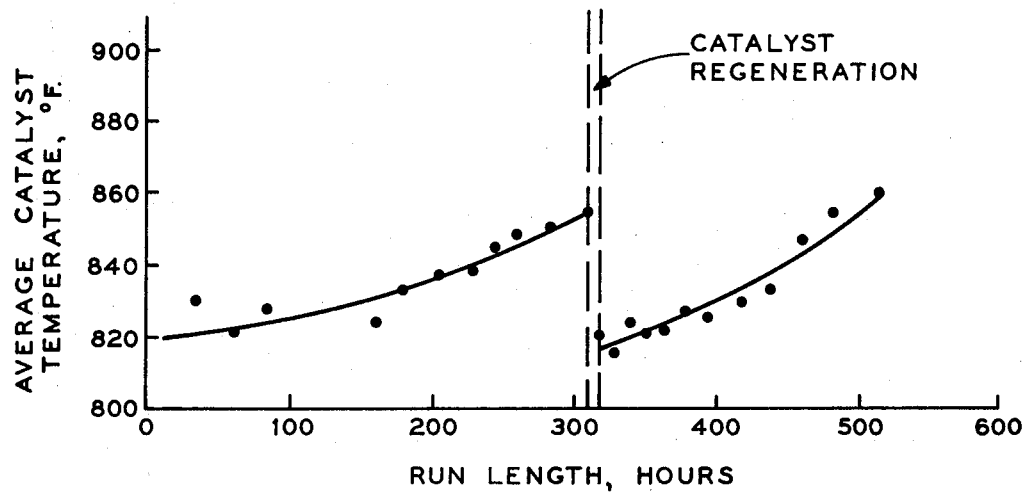
Figure 2:
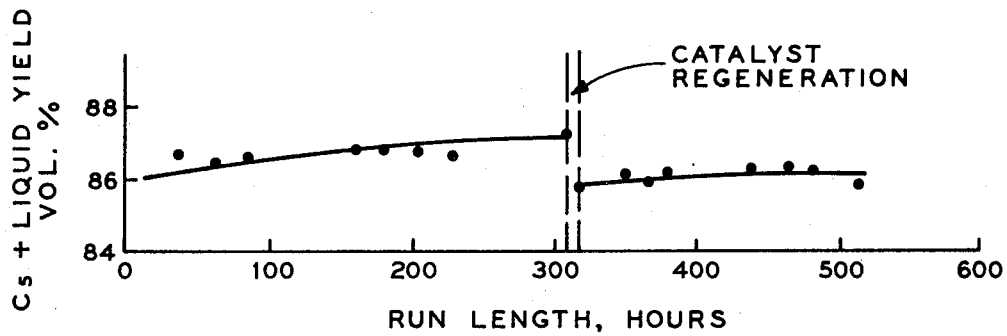

The results of reforming the hydrocracked naphtha at the conditions specified with the platinum-rhenium catalyst are shown in FIGS. 1 and 2. The graph in FIG. 11 shows the average catalyst temperature in degrees Fahrenheit as a function of the length of run. As can be seen from FIG. 1, regeneration of the catalyst resulted in the restoration of substantially the initial activity of the catalyst; i.e., the initial catalyst temperature of the cycle after regeneration was within 20° F. of the initial catalyst temperature of the cycle before regeneration. Thus, after regeneration the initial average catalyst temperature necessary for production of a 97 F–1 clear octane product at the above-specified reforming conditions was approximately 820° F.; this corresponds to a start of run temperature of 820° F. for the first cycle. It is noted that run lengths of approximately 200–300 hours could be obtained between regenerations at the low pressures and low hydrogen to hydrocarbon mole ratios.

The catalyst was regenerated by passing a gas comprising nitrogen and oxygen, the oxygen being present in an amount of less than 1 volume percent, through the catalyst bed at a temperature of 825° F. The temperature in the bed increased to 860° F. as the combustion flame traveled through the bed. The catalyst was then flushed of oxygen, reduced in hydrogen, and contacted again with the feed at reforming conditions.

The graph in FIG. 2 shows the $C_5+$ liquid yield produced during the reforming process as a function of the run length. It can be seen that the yield remained at least about 86 volume percent throughout the run. Regeneration of the catalyst did not result in a decrease in the yield of C₅+ product in the subsequent reforming cycle.

EXAMPLE 2

Low pressure reforming with a catalyst comprising platinum without rhenium and a catalyst comprising platinum and rhenium were compared. The platinum catalyst contained 0.75 weight percent platinum and 0.9 weight percent chloride in association with alumina. The platinum-rhenium catalyst contained 0.6 weight percent platinum, 0.6 weight percent rhenium and 0.6 weight percent chloride associated with alumina. Both catalysts were subjected to reforming of a naphtha feed having the same specifications as the feed identified in Example 1 at reaction conditions including a pressure of 60 psig, a liquid hourly space velocity of 2, and a hydrogen to hydrocarbon mole ratio of 1.5. The temperature was adjusted so as to maintain a 97 F-1 clear octane product throughout the run.

The results of reforming with the two catalysts can be seen in FIG. 3. The graph in FIG. 3 shows the average catalyst temperature necessary to maintain the desired high octane product as a function of the length of run. The platinum catalyst without rhenium rapidly deactivates as can be seen by the rapid temperature increase necessary to maintain the desired 97 F-1 clear product. In comparison to the platinum catalyst, the catalyst comprising platinum and rhenium showed a significantly better stability; i.e., it was not necessary to increase the temperature of the platinum-rhenium catalyst as rapidly as the temperature of the platinum catalyst without rhenium in order to maintain the desired conversion. At the low pressures and low hydrogen to hydrocarbon mole ratios of the present invention, the platinum catalyst rapidly deactivates and hence is not useful for reforming at such conditions. On the other hand, reforming with the platinum-rhenium catalyst at the low pressures and low hydrogen to hydrocarbon mole ratios of the present invention to produce high octane gasoline is definitely attractive.

The foregoing disclosures of this invention are not to be considered as limiting since many variations can be made by those skilled in the art without departing from the scope or spirit of the appended claims.

We claim:

1. A low pressure regenerative reforming process for producing high octane gasoline comprising:
    contacting a naphtha feed, hydrogen, and a catalyst comprising a porous inorganic oxide associated with 0.01 to 3 weight percent platinum, 0.01 to 5 weight percent rhenium and 0.1 to 3 weight percent halide at reforming conditions including a pressure from 20 to 100 psig, a temperature from 600° to 1,100° F., a hydrogen to hydrocarbon mole ratio below 2 and a liquid hourly space velocity from 0.5 to 5;
    periodically discontinuing the contacting after a time of less than about 500 hours;
    regenerating the catalyst to substantially restore its initial activity; and then
    continuing the contacting of the feed, hydrogen, and catalyst under the reforming conditions.

2. The process of claim 1 wherein said porous inorganic oxide is alumina.

3. The process of claim 1 wherein at least 95 F-1 clear octane gasoline is produced.

4. The process of claim 1 wherein said platinum is present in an amount from 0.2 to 1 weight percent and said rhenium is present in an amount from 0.01 to 2 weight percent.

5. A regenerative process for reforming naphtha which comprises contacting said naphtha in the presence of hydrogen at reforming conditions including a pressure of from 20 to 100 psig, a hydrogen to hydrocarbon mole ratio of from 0.5 to 2, a liquid hourly space velocity of 1 to 3, and a temperature from 750° to 1,000° F., with a catalyst comprising a porous inorganic oxide carrier associated with from 0.01 to 3 weight percent platinum, 0.01 to 5 weight percent rhenium, and 0.1 to 3 weight percent halide, for a period of time until the activity of said catalyst is substantially impaired and carbonaceous matter is accumulated thereon, said period of time being less than about 500 hours, discontinuing contacting of the naphtha-hydrogen mixture with said catalyst, purging said catalyst and subjecting said catalyst to regeneration at a combustion temperature in the range of about 750° to 1,200° F. with a stream of inert gas containing sufficient oxygen to effect combustion of said carbonaceous matter, to restore substantially the initial activity of said catalyst, then contacting said catalyst with hydrogen-containing gas, and then contacting said catalyst with naphtha-hydrogen mixture under the conditions previously employed for the reforming operation.

6. In a reforming process wherein a naphtha feedstock is passed in series through a plurality of reaction zones containing a reforming catalyst under conversion conditions to produce high octane gasoline and wherein one of said reaction zones is periodically isolated from the other reaction zones and reforming in said isolated reaction zone is discontinued without discontinuing reforming in the other reaction zones, and regenerating said catalyst in said isolated reaction zone, then placing said isolated reaction zone back into the reforming operation, the average time between regenerations of said reaction zones being less than about 500 hours, the improvement which comprises contacting said naphtha in the presence of hydrogen at reforming conditions including a pressure of from 20 to 100 psig, a hydrogen to hydrocarbon mole ratio of less than about 2, a lower hydrogen to hydrocarbon mole ratio being used at the lower pressures, a liquid hourly space velocity of from 0.5 to 5, with a catalyst comprising alumina associated with from 0.01 to 3 weight percent platinum, 0.01 to 5 weight percent rhenium, and from 0.1 to 3 weight percent halide to produce a high octane gasoline product.

7. A regenerative process for reforming naphtha, which comprises:
    contacting said naphtha in the presence of hydrogen at reforming conditions, including a pressure of from 20 to 100 psig, a hydrogen-to-hydrocarbon mole ratio of from 0.5 to 2, a liquid hourly space velocity of 1 to 3 and a temperature from 750° to 1,000° F. with a catalyst comprising a porous inorganic oxide carrier associated with from 0.01 to 3 weight percent platinum, 0.01 to 5 weight percent rhenium and 0.1 to 3 weight percent halide for a period of time until the activity of said catalyst is substantially impaired and carbonaceous matter is accumulated thereon, said period of time being less than about 500 hours;

discontinuing contacting of the naphtha-hydrogen mixture with said catalyst;

purging said catalyst and subjecting said catalyst to regeneration at a combustion temperature in the range of about 750° to 1,200° F. with a stream of inert gas containing sufficient oxygen to effect combustion of said carbonaceous matter to restore substantially the initial activity of said catalyst;

subjecting said regenerated catalyst to rejuvenation by contacting it, at a combustion temperature in the range of about 750° to 1,200° F. with a rejuvenation gas containing more than about 2 volume percent oxygen, at least after each third regeneration;

contacting said catalyst with hydrogen-containing gas; and then contacting said catalyst with naphtha-hydrogen mixture under the reforming conditions.

8. A process as in claim 7, wherein the rejuvenating gas contains at least 5 percent oxygen.

9. A process as in claim 7, wherein the rejuvenating gas contains at least 20 percent oxygen.

10. A process as in claim 7, wherein the rejuvenating gas comprises substantially pure oxygen.

* * * * *